J. B. TIBBS.
COTTON PICKING MACHINE.
APPLICATION FILED AUG. 4, 1919.
1,346,282.
Patented July 13, 1920.
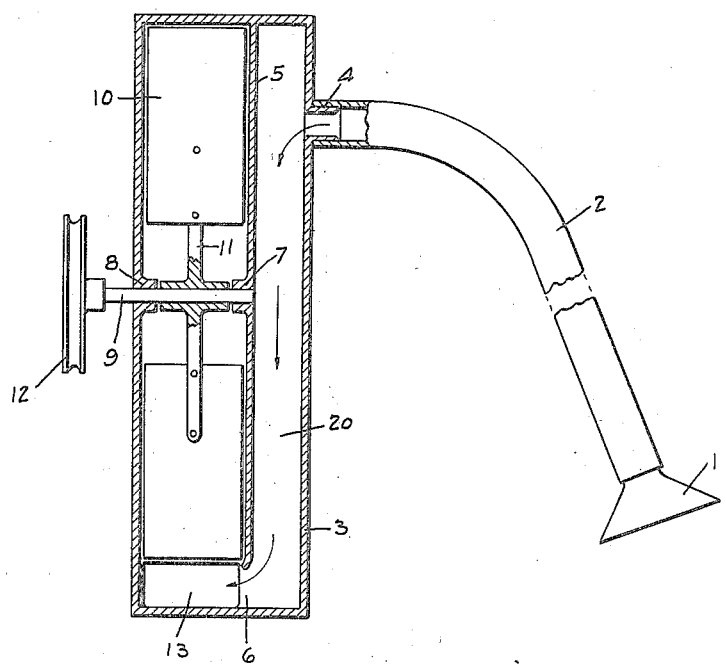
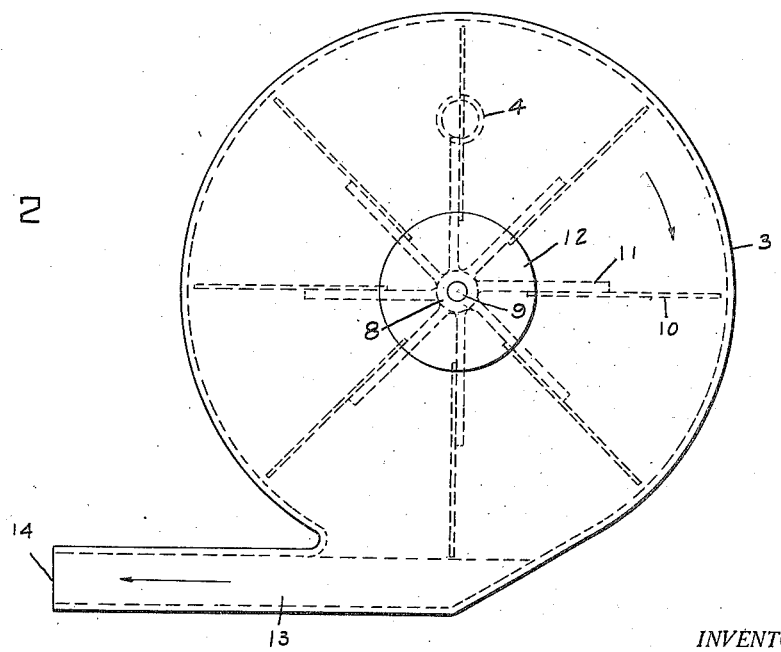
INVENTOR.
Joseph B. Tibbs.
BY
ATTORNEY.

UNITED STATES PATENT OFFICE.

JOSEPH B. TIBBS, OF TIBBS, MISSISSIPPI, ASSIGNOR OF ONE-HALF TO THOMAS TIBBS, OF TIBBS, MISSISSIPPI.

COTTON-PICKING MACHINE.

1,346,282.            Specification of Letters Patent.       Patented July 13, 1920.

Application filed August 4, 1919. Serial No. 315,159.

*To all whom it may concern:*

Be it known that I, JOSEPH B. TIBBS, a citizen of the United States, residing at Tibbs, in the county of Tunica and State of Mississippi, have invented certain new and useful Improvements in Cotton-Picking Machines, of which the following is a specification.

This invention relates to cotton picking machines and has among its objects the production of a machine adapted for picking cotton from the plant in the field. Previously such picking has been done by hand which is a slow, tedious, expensive and inefficient task, or by large, clumsy machines which were generally unsatisfactory. Certain of these machines utilized suction fans but such fans were unreliable mainly in that cotton would in a short time clog them up rendering them useless. By this invention I obviate these difficulties, my machine being simple, effective, reliable and rapid in its operation.

In carrying the objects of my invention into effect I provide a member adapted to be moved over the cotton plant in proximity to the cotton thereon and including means on said member for removing the cotton from the plant preferably by suction, and conveying it to any desired point.

Referring to the accompanying drawings made a part hereof and in which similar reference characters denote similar parts,—

Figure 1 illustrates a vertical sectional view of my device some parts being shown in elevation, and Fig. 2 a side view of the same.

A member 1, which is preferably flared or bell-shaped is adapted to be moved in contact with the cotton on the plant. To bell member 1 is connected a flexible tube 2 preferably of metal and of any desired length connected to a casing 3 at point 4. Within the casing, which is preferably cylindrical, is placed a partition 5 substantially parallel to the ends of the cylinder 3 and having an opening 6 in one end thereof, preferably the lower end. Journaled between said partition and one of the ends of the casing at points 7 and 8 is a shaft 9 upon which are secured blades 10 by means of arms 11 fixed to the shaft. The blades are preferably rectangular, as shown, and fit rather closely to the walls of the compartment there being preferably eight such blades equally spaced around the periphery of the shaft forming a fan or blower. A pulley 12 or equivalent device secured to the shaft 9, is attached to a source of power of any suitable kind, such as is well known in the art. A passage way 13 preferably formed in the lower part of the casing in proximity to the opening 6 in the partition 5 is placed tangential to the cylindrical casing, the opening 14 thereof being connected to suitable means for receiving cotton placed at any desired distance from the machine.

The operation of the device is as follows:

Power is applied to the pulley 12 so as to cause fans 10 to rotate in the direction shown by the arrow in Fig. 2, thus creating a suction in the air chamber 20. The bell member 1 is grasped by hand and slowly passed over the cotton plants whereby the decreased pressure in the air chamber 20, which is transmitted through flexible tube 2 to the bell member causes the cotton to be sucked up into the flexible tube and passed down through the air chamber 20 and out through exit tube 13 to the cotton receptacle.

By providing a partition 5 I separate the fans from the cotton passing through the casing thereby preventing any cotton from becoming entangled in the blades or their operating mechanism. The cotton which is sucked into the air chamber is forced out by positive pressure of the fans through passage 13 thereby insuring that no cotton is accidentally sucked into the fan chamber.

Having thus fully described my said invention, what I claim as new and desire to secure by Letters Patent, is:

1. In a cotton picking machine, a bell member, a flexible tube connected thereto, a casing having an imperforate partition therein, a fan in one of the compartments thus formed and a connection from said casing to said flexible tube.

2. In a cotton picking machine, a bell member, a flexible tube connected thereto, a casing having an imperforate partition therein forming a fan chamber and an air chamber, connected to said flexible tube, an outlet from the bottom of said air chamber communicating with said fan chamber, and a fan in said fan chamber.

3. In a cotton picking machine, a bell member, a flexible tube connected thereto, a casing connected to said flexible tube, an imperforate partition in said casing having an opening therein, said partition being substantially parallel to the ends of said casing, a shaft journaled between said partition and end of casing, a fan connected to said casing and means for rotating said shaft.

4. In a cotton picking machine, a bell member, a flexible tube connected thereto, a casing connected to said flexible tube, an imperforate partition in said casing having an opening therein, said partition being substantially parallel to the ends of said casing, a shaft journaled between said partition and end of casing, a fan connected to said casing, means for rotating said shaft, and a tangential opening formed in the lower portion of said casing in proximity to the opening in said partition.

5. In a cotton picking machine a suction chamber comprising a cylindrical casing, an imperforate partition dividing the same into a fan chamber and air chamber, placed parallel to the ends of said cylinder, a shaft extending through one end of said casing into said fan chamber, a fan connected thereto, means for rotating said shaft, an inlet opening to said air chamber, an exit opening therefrom, and a passageway from said fan chamber communicating with said air chamber.

In witness whereof I have hereunto set my hand and seal at Tibbs, Mississippi, this 23rd day of July, A. D. nineteen hundred and nineteen.

JOSEPH B. TIBBS. [L. S.]

Witnesses:
  E. W. TAYLER,
  R. J. LAUDERDALE.